(No Model.)
G. H. BLAKESLEY.
METHOD OF MAKING ARMLETS, &c.
No. 411,416. Patented Sept. 24, 1889.
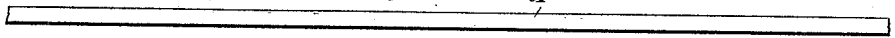
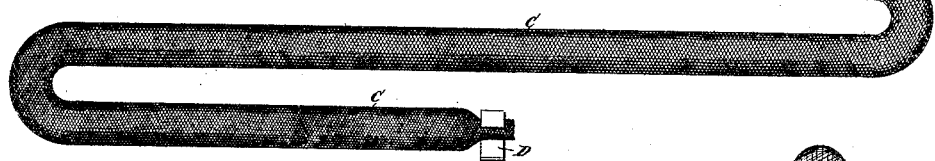
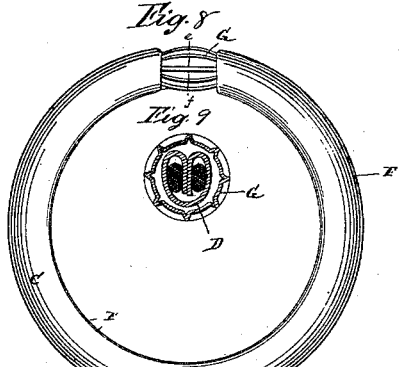
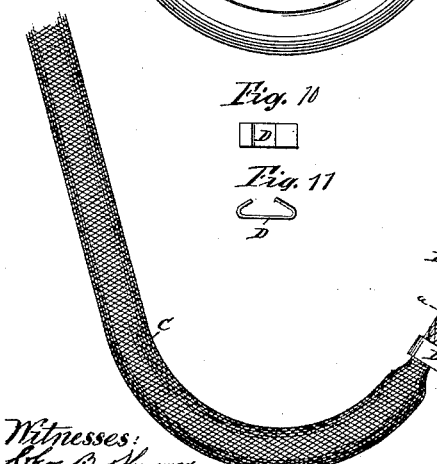
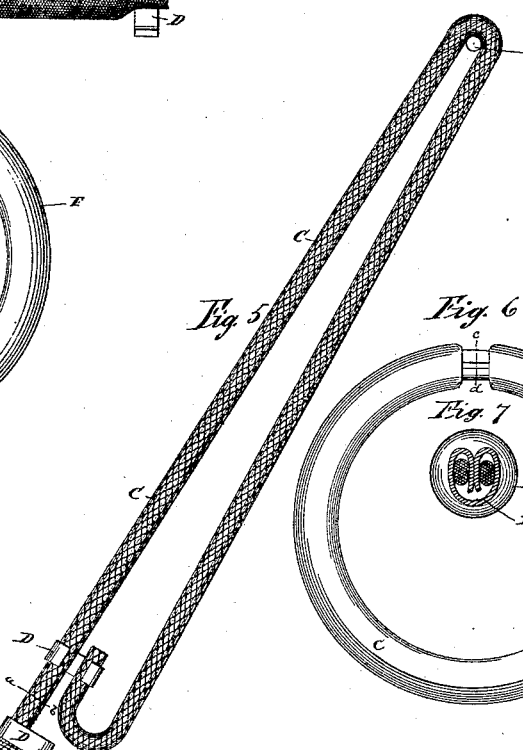
Witnesses:
Inventor
Gilbert H. Blakesley.
By George D. Seymour
Atty.

UNITED STATES PATENT OFFICE.

GILBERT H. BLAKESLEY, OF BRISTOL, CONNECTICUT, ASSIGNOR TO THE BLAKESLEY NOVELTY COMPANY, OF SAME PLACE.

METHOD OF MAKING ARMLETS, &c.

SPECIFICATION forming part of Letters Patent No. 411,416, dated September 24, 1889.

Application filed March 25, 1889. Serial No. 304,613. (No model.)

*To all whom it may concern:*

Be it known that I, GILBERT H. BLAKESLEY, residing at Bristol, in the county of Hartford and State of Connecticut, have invented certain new and useful Improvements in Methods of Working up Elastic Braided Stock; and I do declare the following to be a full, clear, and exact description of the same, reference being had to the accompanying drawings, which form a part of this specification.

My invention relates to an improved method of working up elastic stock composed of rubber and fiber, the fiber confining the rubber and braided, woven, wound, or otherwise combined with it, the object being to effect an economy of time, labor, tools, and material over the methods heretofore employed, and to make a grade of goods superior to anything yet produced in this line.

With these ends in view my invention consists in a method of working up elastic stock composed of rubber and fiber confining it, consisting in binding the free ends of the rubber and fiber together, then stretching the stock, then binding the rubber and fiber together at closely adjacent points, and then cutting the stock between such points.

My invention further consists in a method having certain other features, as will be hereinafter described, and pointed out in the claims.

For the purpose of illustrating my invention I have elected to represent the manufacture under it of arm-bands from stock consisting of a rubber core and a braided covering of fiber.

In the accompanying drawings, Figure 1 is a view of a section of a rubber strand such as may be employed for making elastic braided stock to be worked up into arm-bands under my invention. Fig. 2 is a view of a section of unfinished stock having a rubber core and a single braided covering, the rubber being shown under tension and the covering as applied with a rapid feed. Fig. 3 is a view of a section of finished stock which has two coverings, the stock being shown under tension. Fig. 4 is a view of the free or unreeled end of a long length of stock in its normal or relaxed condition, showing the end of the rubber core and the end of the braided cover bound together by a two-armed clasp. Fig. 5 is a view showing such end of the stock stretched and its core and covering bound together again at two adjacent points, marking the length to be cut off for an arm-band or similar article. Fig. 6 is a view of a band formed by cutting the stock on the line $a\,b$ of the preceding figure with the stock in its normal condition and with the clasp doubled to bring the ends of the stock in line. Fig. 7 is an enlarged sectional view on the line $c\,d$ of Fig. 6. Fig. 8 is a view of a finished arm-band made under my invention. Fig. 9 is a sectional view on the line $e\,f$ of Fig. 8. Fig. 10 is a detached plan view of one of the two-armed clasps, and Fig. 11 is a similar edge view thereof.

In producing the stock illustrated by the drawings a very long rubber strand A is passed under tension through a braiding-machine applying a covering B of cotton thread. This product is then passed under tension through a braiding-machine applying a loose covering C of soft thread, such as silk or wool, the two coverings so applied forming a soft compound cover confining the rubber.

In working up such stock in the manufacture of arm-bands one end of its core and one end of its cover are bound together by being clasped between the arms of a small two-armed clasp D, made of light sheet metal, the other end of the core and covering being virtually bound together by the compressing action of the overlying coils of stock, which is wound on a reel as it leaves the braider applying the second covering. A length of stock suitable for an arm-band is then measured off, and, as herein shown, engaged with a conveniently-located pin E and stretched. Then the clasp at the end of the stock is turned inward, so as to bring the ends of the band to be formed end to end, and its free arm clamped upon the stock to bind the rubber and cover together at a point just outside of the place where the stock is to be cut. The rubber and cover are also bound together at a point just inside of the point where the division is to be made by clamping them between the arms of another and similar clasp. The rubber and cover having now been secured together on opposite sides of the point where the stock is to be cut, the stock is cut, as indicated by the line $a\,b$ of Fig. 5 of the drawings. The stock cut off at once recovers its normal condition and forms the band F, and the clasp just applied is left at the end of the stock to answer for the clasp of the next band, which is formed by repeating the operation above described, and so on. Before or after the loop formed at the end of the stock is cut off the clasp is bent double, as shown by Figs. 6, 7, and 9 of the drawings, to bring the ends of the band practically into line. The band F is finished by the application of a corrugated trimming G, which is closed around the clasp to conceal it. It will be understood that the stretching of the measured end of the stock is to reduce it in size, so as to permit the application of the clasps, which would not otherwise be firmly and neatly secured in place. By thus binding the rubber and cover together at points on opposite sides of and adjacent to the place where the stock is to be cut by the described progressive application of clasps the rubber is always kept under control and prevented from escaping and retreating into the cover and so entailing waste thereof by necessitating the cutting of the cover until the end of the rubber is reached.

In producing stock such as illustrated the tension of the rubber and the feed of the braiding-machine are regulated so that the coverings will reach the limit of their extension under longitudinal strain on the stock before the rubber reaches the limit of its safe extension, which is that extension from which it will completely recover and under which there is no liability of its breaking. The coverings therefore protect the rubber from being impaired as to its elasticity and also from being broken. In producing such stock, also, the tension of the rubber and the feed of the braiding-machine are regulated so that in the normal and unstretched condition of the stock and the articles made from it the rubber will be under no tension whatever, whereby its elastic character is preserved unimpaired and its life greatly prolonged; also, by following the described mode of producing the stock the covering thereof is in all practical conditions of the stock extremely soft and fluffy, and hence very comfortable to the wearer and elegant in appearance.

As already indicated, my invention is applicable to working up all kinds of stock composed of rubber and fiber confining it, whether the fiber is applied by braiding, weaving, winding, or otherwise. It is also immaterial whether the stock is round or flat in cross-section or whether it has one or more strands of rubber; but whatever the character of the stock and however it may be produced, it is desirable to observe in its production the described tensional regulations for the rubber and fiber.

In making articles having an independent clasp at each end several clasps might be applied to the stock before cutting it into short lengths. I would therefore have it understood that I do not limit myself to the exact steps and succession of steps herein shown and described; but hold myself at liberty to make such changes and alterations as fairly fall within the spirit and scope of my invention.

Having fully described my invention, what I claim as new, and desire to secure by Letters Patent, is—

1. A method of working up elastic stock composed of rubber strands and a fibrous envelope therefor into short sections bound at each end, consisting in binding the free ends of the rubber and fiber together, then stretching the stock, then binding the stretched rubber and fiber together again at two closely adjacent points, and then cutting the stock between such points, substantially as set forth.

2. A method of working up elastic stock composed of rubber strands and a fibrous envelope therefor into circlets, consisting in binding the free ends of the rubber and fiber together, then stretching the stock, then attaching the said bound ends to the stretched stock and binding the rubber and fiber thereof together at the said point of attachment, then binding the stretched rubber and fiber together again at a point close to the said point of attachment, and then cutting the stock between the two bound points last mentioned, substantially as set forth.

In testimony whereof I have signed this specification in the presence of two subscribing witnesses.

GILBERT H. BLAKESLEY.

Witnesses:
M. L. TIFFANY,
W. H. GRAHAM.